United States Patent [19]
Genis

[11] 4,211,738
[45] Jul. 8, 1980

[54] LIGHTWEIGHT AGGREGATE

[76] Inventor: Gerhard Genis, P.O. Box 12178, Benoryn, South Africa, 1504

[21] Appl. No.: 818,547

[22] Filed: Jul. 25, 1977

[51] Int. Cl.² .............................................. B01J 2/12
[52] U.S. Cl. ..................................... 264/44; 264/117; 264/122
[58] Field of Search ..................... 264/117, 122, 60, 44

[56] References Cited
U.S. PATENT DOCUMENTS

| | | | |
|---|---|---|---|
| 2,946,112 | 7/1960 | Tucker, Jr. et al. | 264/117 |
| 2,948,948 | 8/1960 | Duplin, Jr. et al. | 264/117 |
| 3,977,892 | 8/1976 | Crossmore, Jr. | 264/117 |
| 4,025,596 | 5/1977 | Parks et al. | 264/117 |

*Primary Examiner*—Donald J. Arnold
*Assistant Examiner*—James R. Hall
*Attorney, Agent, or Firm*—Omri M. Behr

[57] ABSTRACT

A lightweight aggregate comprising a sand and cement accreted onto a nucleus particle of expanded polystyrene which is coated with molasses to aid accretion and a clay accreted onto a nucleus particle of combustible vegetable material. The sand and cement may include powdered and granular expanded polystyrene to further lighten the aggregate and the clay may have finely divided vegetable matter admixed. The vegetable matter nucleus and admixture to the clay is carburized and volatilized when the clay is fired. Subsequent layers are accreted using different raw material in each layer, to make an "onion effect". Several lightweight aggregate particles are agglomerated in larger overall particles using a bonding agent.

6 Claims, 3 Drawing Figures

LIGHTWEIGHT AGGREGATE

BACKGROUND OF THE INVENTION

This invention concerns improvements in and relating to lightweight aggregate, more particularly lightweight aggregate which may be employed in the making of concrete. This invention in particular relates to the loose particulate material in various gradings of size which can be mixed with cement for the making of concrete.

Lightweight aggregate (abbreviated LWA) is an important material for prefabricated concrete construction techniques. Normal prefabricated concrete components cause considerable problems and costs in their transportation to the site and in their installation on site. The reason for this is that these components easily become very heavy due to the high density of conventional concrete. A further disadvantage of conventional concrete prefabricated components is that they can break under their own weight during handling particularly for example when they are incorrectly lifted. These problems can be overcome to a large extent by the use of lightweight concrete and such material has gained appreciable acceptance in the art. The use of LWA for prefabricated concrete components results in lighter components with substantial reductions in transportation and handling costs and in some cases lessened tendency for breakages. These advantages are, however, in many cases detracted from by the disadvantage of relatively high manufacturing cost of LWA as compared with ordinary quarried stone. The LWA which is generally available is manufactured in high temperature rotary kilns or blast furnaces. These manufacturing techniques inevitably result in rather high costs being incurred, particularly high capital costs and high heating costs. Particularly in a relatively low volume turnover, this causes the LWA to be expensive.

Included in these types of LWA are those produced from clays, shale, slag or cinders which are expanded at high temperature to produce a porous rock-like substance which may either be produced immediately in the final sizes and then graded or which may be ground into desired sizes.

The compressive strength of these units may even be made comparable with quarried stone in the best examples. LWA has further advantages apart from its low weight, including better heat and sound insulating qualities and also water absorption qualities which is beneficial for obtaining a fast initial set of the concrete in use.

LWA is generally classified in terms of size into so called coarse aggregate and fine aggregate, the arbitrary division being ¼" and above being classified as coarse aggregate and 3/16" and below being classified as fine aggregate. Concrete can be manufactured entirely from LWA and cement or else either of the coarse aggregate or the fine aggregate can be natural stone while the other is LWA.

SUMMARY OF INVENTION

Broadly, the invention provides a method of making a lightweight aggregate, including the step of causing particles of raw material suitable for constituting the aggregate to be accreted on to a nucleus, the nucleus being of low density or being capable of being rendered of low density by a further step in the method.

Further according to the invention, there is provided a lightweight aggregate including grains comprising particles of raw material suitable for constituting the aggregate accreted on to a nucleus, the nucleus being of low density or being capable of being rendered of low density.

According to one aspect of the invention, the nucleus is of an expanded polystyrene.

According to a first alternative aspect of the invention, the nucleus is of a material which is capable of being at least partially driven off by volatilisation or the like.

According to a second alternative aspect of the invention, the nucleus is of a combustible material. One such combustible material which is suitable for many purposes is coal.

In one form of the invention, the nucleus is coated or otherwise treated with a medium for improving the accretion. According to one aspect of this form, the nucleus is of a hydrophobic material and the medium is a solution comprising a hydrocarbon such as molasses, sugar or starch in water. Advantageously, or perhaps in some cases necessarily, the medium is carburised after accretion of the raw material.

The raw material, in one form of the invention, comprises cementitious material. In one alternative form, the raw material comprises clay or similar material which is hardened by baking or firing.

According to one feature of the invention, a fibrous material is mixed with the raw material and accreted therewith on to the nucleus.

A second feature of the invention provides that mixed with the raw material are particles of material of low density or being capable of being rendered of low density.

Yet another feature of the invention provides the step of causing a second layer of particles of raw material to be accreted on to a nucleus which already has a first accreted layer.

The accretion is advantageously brought about by rolling the nucleus in a bed of the particles of raw material. According to yet another important aspect of the invention, the method includes the step of causing a number of the nuclei carrying accreted raw material, to be bonded together.

As an example of a first embodiment of this invention each nucleus particle comprises an expanded polystyrene pebble. The expanded polystyrene particles are conveniently in the range of sizes described as a fine aggregate. The expanded polystyrene particles are of course of outstandingly low density or lightness and are employed with a sand and cement mixture which is accreted on to the outer surface of the particles. The sand and cement is then allowed to cure in the normal way and so acquire full strength. The sand and cement are preferably in a dry state in the bed, sufficient water being added during accretion (via the nucleus) and afterwards for curing.

Polystyrene is of course merely an example and any expanded plastics bead or pebble could be employed, the expanded plastics being preferably reasonably rigid. The rigidity must be sufficient so that when the particle is rolling in the bed of powdered sand and cement and during any subsequent processing the particle does not deform dimensionally sufficiently to dislodge the sand and cement which is accreted on to its surface.

The expanded plastics pebbles or beads may also be employed with clay of suitable grade which is then baked or fired at high temperature to achieve a very strong particle. In this process the polystyrene will be volatilised and may leave a hollow space inside.

However, in another embodiment where clay or other material which has to be subjected to heat treatment is employed, a nucleus particle is advantageously a material such as wood or coal which will survive the heat treatment until the clay has achieved at least a certain level of strength and which will then be burnt away during the latter stages of the heat treatment. This capacity to be burnt is an advantage in that it will provide an additional source of heat for the heating of the clay or similar material.

Wood and coal have been mentioned merely as examples, but the invention is not limited to these materials or even necessarily to similar materials. Broadly the invention is preferably employed with common, inexpensive and easily available materials. The material for the nucleus must, however, be of low density i.e. lower than that of sand and cement, or clay. For example, certain naturally occurring small particles may be employed such as sugar cane, chaff, seeds and the like.

In yet another embodiment of the invention, a volatilisable or lightweight powdered material is mixed with the powdered raw material for the LWA. The effect of mixing a volatilisable material in the powdered raw material is that when the powdered raw material sets and hardens by heat treatment the particles of the volatilisable material are volatilised leaving a porous structure. Thus the resulting LWA not only has a cavity within it but also its walls surrounding the cavity are more or less porous. In the case of clays and the like which are to be subjected to heat treatment the additional material can comprise coal dust, fine sawdust and the like which will volatilise with the subsequent heat treatment. On the other hand, with the use of raw materials such as cement and sand which may not be subjected to subsequent heat treatment the additional material can comprise a powdered expanded plastics material. The admixing of such expanded plastics material with the sand and cement will result in a lightening of the sand and cement after it has set and will also result in a certain porosity thereof.

In a development of this latter embodiment, the particle is made in a number of separate steps, one layer of raw material being accreted on to another so that the particle is in fact made up of a number of successively treated layers like an onion. Thus the original nucleus particle is coated initially with a pure sand and cement mixture providing a first layer purely of sand and cement and a relatively low porosity. Then the particle is rolled in a powdered mixture of sand and cement and also powdered expanded polystyrene providing a second layer of comparatively lower density and exhibiting a certain porosity. Further layers could similarly be applied as desired or required to build up the final LWA particle.

In yet another example of the invention fibrous material is added to the powdered raw material for the LWA particles. Asbestos fibres, which may be comparatively short in length can be included in the mix so as to achieve a certain increase in strength and toughness of the particles. Also the presence of the fibres may increase the capacity of the particles to form a strong bond in a concrete in which the LWA is employed subsequently. Any type of fibre of a suitable kind may be employed although again preferably an inexpensive and easily available fibre will be chosen. Glass fibre may thus be rather expensive except possibly in reject quality while vegetable fibres and other naturally occurring fibres may also be suitable.

The process will usually comprise a first step of sorting and grading by size the nucleus particles which are to be employed in the rolling and accretion step of the process.

Quite generally it may be necessary or desirable to treat the surface of the nucleus particles so as to adapt them to more effectively or easily accrete the powdered raw material. For example in the case of expanded polystyrene and other hydrophobic materials water may not be suitable unless it has dissolved in it a material which provides the required effect. One such a material for expanded polystyrene particles is a very dilute mixture of molasses in water. The polystyrene particles are dunked in such a solution by being held in an open pored bag or a cage which is submerged under the water/molasses mixture. Analogous materials such as starch and sugar may also be dissolved in water for this purpose. However, where such materials are employed it is desirable to subject them to an initial heat treatment after the accretion of cement and sand so as to carburise the molasses or similar molecules. This is necessary or otherwise such materials may have a retarding effect on the curing of the cement. The heat treatment must of course be comparatively mild, merely sufficient to carburise such a material as molasses lightly. The resulting material may even have a beneficial effect on the rate of curing of the cement.

In the case of such nucleus materials as wood and coal simply water may be most effective to achieve the necessary accreting effect.

In one example of the invention, the process of accreting is carried out in a cylindrical drum which is adapted to be rolled with the raw material in powder form in it as well as the nucleus particles. It is an advantage of this invention that the effective density of LWA may be varied within wide limits by varying the amount of rolling which is done and hence the thickness of the skin which will surround the nucleus particles. Naturally a relatively thin skin surrounding a fairly large nucleus particle will result in a very light LWA which may however be of comparatively low strength. By contrast a comparatively thick skin accreted upon a comparatively small nucleus particle will result in a heavier LWA which will nevertheless have a higher strength. These densities may then of course further be modified by the employment of additional materials in the raw material for the LWA such as powdered coal in clay in the manner described above. In a case where the raw LWA particles are to be subjected to a heat treatment such as with clay as the raw material for the particle it is necessary that the humidity content of the clay be reduced to an acceptable level prior to the baking or burning process. This is necessary to avoid the disintegration of the particles due to vaporisation of the water in the material of the particle. Similarly the moisture content of the nucleus particle must be reduced to an acceptably low level. The achievement of a correct moisture content can of course also be helpful in that the volatilisation of the water may have the effect of making the resulting LWA porous and hence of lower density. The porosity as such of course may also be an advantage in the use of the LWA in making concrete as referred to above.

Combinations of these possibilities may be employed within the scope of this invention. In one example of such a combination a coal nucleus particle may be moistened on its surface with water and accreted with a mixture of powdered clay and powdered coal. This particle when subjected to heat treatment results in a hollow LWA particle, the skin of the particle surrounding the central hollow moreover being porous. In a development of the above example this particle is then provided with a coating of sawdust again by a rolling process after moistening the surface of the particle. This sawdust coating is then covered with a further coating of powdered clay mixed with coal dust and the composite particle is again subjected to a heating process so as to harden and strengthen the clay. Alternatively, instead of using wood sawdust and clay in the second step described one may alternatively first use powdered expanded polystyrene followed by a mixture of powdered cement and sand which may be subjected to a curing process which does not involve the use of heat. In this manner lightweight aggregate of practically any size can be manufactured.

The process may also be successful in the manufacture of very fine lightweight aggregate for example a lightweight aggregate in which the particles are merely approximately 1 mm in diameter.

In yet another embodiment of this process, the initial nucleus particles which have received an accreted coating of raw material are bonded together to provide a composite particle of irregular shape. In one example, about a score of nucleus particles are bonded together with a cement slurry. The large composite particle so produced is then rolled in a bed of sand and cement to provide it with an outer skin. This is done because a single nucleus particle of diameter equivalent to the composite particle may not have sufficient crush strength to meet its service requirements.

Similar composite particles can be made up with clay as the accretion instead of cement and sand. Still another example of the invention comprises the preparation of a bed of powdered material suitable to result in a porous product, for example clay and coal, cement, sand and fine sawdust and the like. The powder bed is placed on the inner surface of a drum which is rotated. A drop of a binding liquid is dropped into the powder bed during the rotation and the drop of binding liquid creates a small particle of the powdered material. The particle is built up by the accretion process and after it has been hardened it has a porous quality. The binding liquid can be any suitable liquid as described above.

A further way of making the raw LWA particles would be to extrude a suitable mixture which has already received binder liquid. The extrusion will be adapted to form raw pellets and again the powdered raw material will contain an admixture of a powdered material which is adapted to confer porosity to the final product.

DESCRIPTION OF THE PREFERRED EMBODIMENTS

Figure 1:
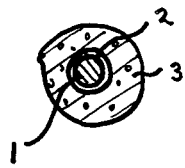
FIG. 1 is a cross section through a LWA particle made in one accretion step.

In FIG. 1 the nucleus 1 is mainly gas left over from the vapourising of a pellet of expanded polystyrene. A layer of molasses 2 surrounds it. Accreted around the outside is a hard shell of clay 3 which has been made porous by inclusion of tiny particles of coke which were burnt mostly away when the particle was fired to harden the clay.

Figure 2:
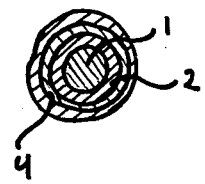
FIG. 2 is a cross section through a LWA particle made in several accretion steps.

In FIG. 2 the nucleus 1 is an expanded polystyrene pellet, having a molasses layer 2 around it and several successively applied layers 4 of cemented sand giving an "onion effect". Alternate layers of the cemented sand have expanded polystyrene in powdery form admixed so as to give lightweight layers.

Figure 3:
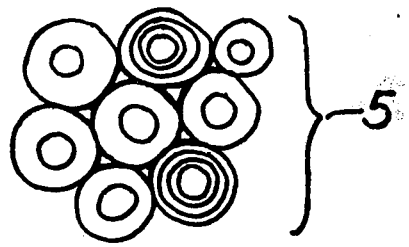
FIG. 3 is a cross section through a LWA particle made up as a composite of several smaller particles as shown in FIGS. 1 and 2.

In FIG. 3 a larger LWA particle 5 is made up of several smaller particles as made in FIGS. 1 and 2. The smaller particles are bonded together by cement/sand, fired clay, or other suitable cement. The particle as a whole has a better crushing strength than a particle of the same overall size and having a single concentric hollow space and similar lightness. This is because the strength of a sphere increases as its radius diminishes, other things being equal.

As examples of quantities and proportions the following can be given:

EXAMPLE 1

Sand, cement and clay are pre-mixed in equal volumetric proportions and then powdered in a roll or ball mill. This powder is then accreted onto polystyrene beads on a conventional table in the process described above in volume proportions of 1 part polystyrene to 2 parts powder. The polystyrene beads are in the size range approximately 8/32" to 1 3/16", that is, "coarse" aggregate as defined above. The beads and powder were fed to the accreting table in the proportions mentioned.

The resulting raw particles were allowed to set to full strength of the cement and used as a LWA in a concrete mixed in the volume proportions:

1 cement:3 sand:5 LWA

The weight reduction over concrete using conventional quarried stone in place of LWA, in the same proportions was 27%.

An LWA made from 1 part polystyrene beads to 1 part powder and used in a concrete having the proportions:

1 cement:4 sand:6 LWA gave a weight reduction of 18% over concrete using quarried stone in the same proportions in place of LWA.

EXAMPLE 2

The same procedure was adopted as in Example 1, using polystyrene beads in the size range 1/32" to 1 3/16", that is, fine-and-coarse aggregate. The weight savings on the same basis as in Example 1 were 44% and 21% respectively.

The table below summarises these results

| Example No | Volume Proportions of LWA constituents | | Concrete Mix | | | Weight Saving over Conventional Concrete |
|---|---|---|---|---|---|---|
| | Polystyrene Beads | Sand and Cement and Clay Powder | Cement | Sand | LWA | |
| 1 (Coarse) LWA | 1 | 2 | 1 | 3 | 5 | 27% |
| | 1 | 1 | 1 | 4 | 6 | 18% |
| 2 | 1 | 2 | 1 | 3 | 5 | 44% |

-continued

| Example No | Volume Proportions of LWA constituents | | Concrete Mix | | | Weight Saving over Conventional Concrete |
|---|---|---|---|---|---|---|
| | Polystyrene Beads | Sand and Cement and Clay Powder | Cement | Sand | LWA | |
| (Fine and Coarse L W A) | 1 | 1 | 1 | 4 | 6 | 21% |

Size Ranges:
The size range for LWA made in accordance with this invention is, for example
1/32"—¼" (fine)
¼"—2½" (coarse)
An exceptionally coarse aggregate, up to 4", can even be made, using the agglomeration technique described above.

Fabrication cycles:
After wetting of the nucleus particles the rolling-coating process begins immediately. A further wetting is optional to obtain a thicker coating and therefore denser particle.
After coating with a sand-clay-cement powder the setting period in open air at room temperature can be 1 to 4 days. Then the firing starts and can take 1 to 3 days, depending on such factors as weight, quantity, mix, clay sort and heat temperature.

Mixtures for Coating Powder:
Where only sand and cement are used a suitable proportion is 1 part cement to 4 to 8 parts sand by volume. A sand-clay-cement mixture has been specified above. In this case the setting process is important to avoid cracking. Baking techniques are comparable with the baking of face bricks.

Figure 4:
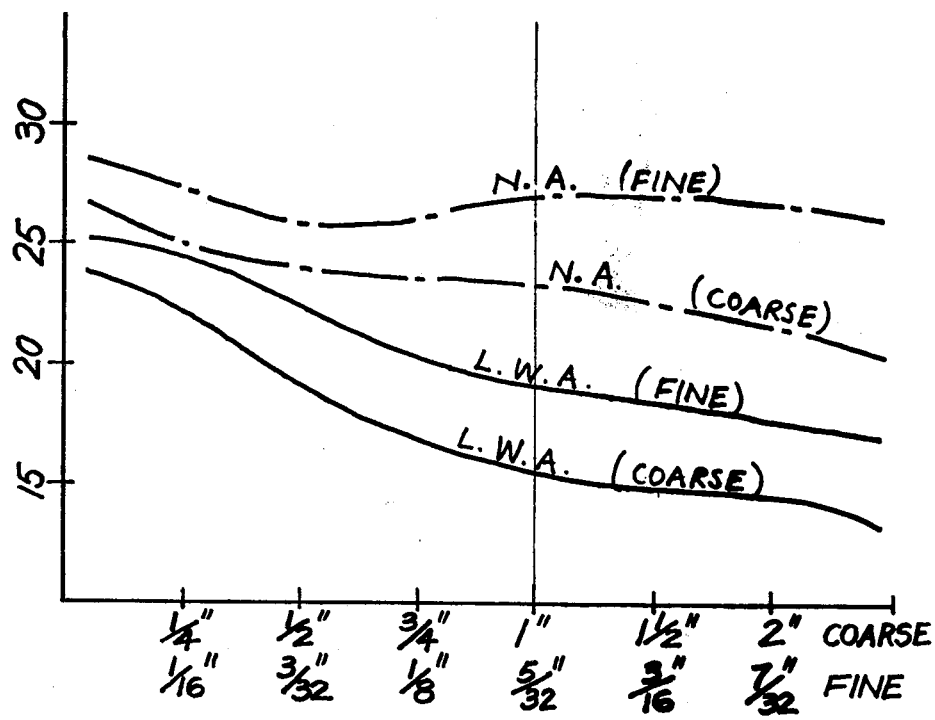

Wetting Mixtures:
To wet polystyrene particles for use as nuclei a dilution of treacle in water in the volume proportions of:
2 to 4 parts treacle:100 parts water is suitable LWA Strengths:
FIG. 4 shows a possible trend between strengths of natural aggregates and LWA. From this it is suggested that fabrication of fine LWA is to be considered advantageous.
In the case of fibre reinforced LWA greater LWA strengths are expected to be achieved.

What I claim is:
1. A method of making a lightweight aggregate for preparing lightweight concrete comprising the steps of:
   (a) providing a bed of a ground, powdered sand and cement
   (b) coating nucleus particles selected from the group consisting of expanded plastics material, combustible vegetable material and coal having a diameter between about ¼" to about 1 3/16" with an adhering agent selected from the group consisting of molasses, aqueous starch suspension, and water;
   (c) introducing said coated nucleus particles into said bed of powdered sand and cement and rolling said nucleus particles in said bed to cause accretion of said sand and cement mixture upon said nucleus particles to form a layer on said wetted particles.
   (d) removing said coated particles from said ground mixture and;
   (e) allowing said coated particles to dry causing said cement to cure to form said lightweight aggregate.

2. A method of making a lightweight agglomerate for preparing lightweight concrete comprising the steps of:
   (a) providing a bed of a ground, powdered sand and cement;
   (b) coating nucleus particles selected from the group consisting of expanded plastics material, combustible vegetable material and coal having a diameter between about ¼" to about 1 3/16" with an adhering agent selected from the group consisting of molasses, aqueous starch suspension, and water;
   (c) introducing said coated nucleus particles into said bed of powdered sand and cement and rolling said nucleus particles in said bed to cause accretion of said sand and cement mixture upon said nucleus particles to form a layer on said wetted particles;
   (d) removing said coated particles from said ground mixture and;
   (e) allowing said coated particles to dry causing said cement to cure to form a lightweight aggregate,
   (f) wetting said lightweight aggregate with an adhering agent selected from the group consisting of molasses, aqueous starch suspension, and water,
   (g) introducing said lightweight aggregate particles into a bed containing a mixture of ground, powdered sand and cement,
   (h) rolling said coated lightweight aggregate particles in said ground, powdered sand and cement mixture to form agglomerates of between about 2 to about 20 granules of lightweight aggregate coated with said sand and cement mixture and;
   (i) allowing the cement in said agglomerates to cure.

3. A method of making cured lightweight aggregate for preparing lightweight concrete comprising:
   (a) coating nucleus particles selected from the group consisting of expanded plastic material, combustible vegetable material, and coal having a diameter of from about ¼" to about 1 3/16" with adhering agents selected from the group consisting of molasses, aqueous starch suspension, and water;
   (b) introducing said coated nucleus particles into a bed comprising a first portion consisting of ground, powdered sand and cement and a second portion selected from the group consisting of expanded plastic material, combustible vegetable matter, and coal wherein both said first and said second portions have substantially equal particle diameters said particle diameters being less than the diameters of said nucleus particles;
   (c) rolling said nucleus particles in said bed to adhere bed particles upon said nucleus particles to provide aggregate having said cement in uncured form;
   (d) removing said aggregate from said bed; and
   (e) curing said cement coating on said aggregate to form said cured lightweight aggregate.

4. A method of making a lightweight aggregate or aggregates for preparing lightweight concrete comprising the steps of:
   (a) providing a bed of ground, powdered clay;
   (b) coating nucleus particles selected from the group consisting of expanded plastics material, combustible vegetable material and coal having a diameter between about ¼" to about 1 3/16" with an adhering agent selected from the group consisting of molasses, aqueous starch suspension, and water;
   (c) introducing said coated nucleus particles into said bed of powdered clay and rolling said nucleus particles in said bed to cause accretion of said clay upon said nucleus particles to form a layer on said wetted particles;
(d) removing said coated particles from said bed and;
(e) allowing said coated particles to dry; and
(f) firing said clay to form said lightweight aggregate or aggregates.

5. A method of making lightweight solid agglomerates for preparing lightweight concrete comprising the steps of:
(a) providing a bed of ground, powdered clay;
(b) coating nucleus particles selected from the group consisting of expanded plastics material, combustible vegetable material and coal having a diameter between about 174 " to about 1 3/16" with an adhering agent selected from the group consisting of molasses, aqueous starch suspension, and water;
(c) introducing said coated nucleus particles into said bed of powdered clay and rolling said nucleus particles in said bed to cause accretion of said clay upon said nucleus particles to form a layer on said wetted particles;
(d) removing said coated particles from said ground mixture and;
(e) allowing said coated particles to dry;
(f) firing said clay to form a lightweight aggregate,
(g) wetting said lightweight aggregate with an adhering agent selected from the group consisting of molasses, aqueous starch suspension, and water,
(h) introducing said lightweight aggregate particles into a bed containing a mixture of ground, powdered clay;
(i) rolling said coated lightweight aggregate particles in said ground, powdered clay mixture to form agglomerates of between about 2 to about 20 granules of lightweight aggregate coated with said clay and;
(j) allowing said agglomerates to dry;
(k) firing said agglomerates to provide solid agglomerates.

6. A method of making lightweight aggregate for preparing lightweight concrete comprising:
(a) coating nucleus particles selected from the group consisting of expanded plastic material, combustible vegetable material, and coal having a diameter of from about ¼" to about 1 3/16" with adhering agents selected from the group consisting of molasses, aqueous starch suspension, and water;
(b) introducing said coated nucleus particles into a mixed bed comprising a first portion consisting of ground powdered clay and a second portion selected from the group consisting of expanded plastic material combustible vegetable matter, and coal wherein both portions have substantially equal particle diameters said particle diameters being less than the diameters of said nucleus particles;
(c) rolling said nucleus particles in said mixed bed to cause accretion of the mixed bed particles upon said nucleus particles to provide aggregate having a clay coating in unfired form;
(d) removing said aggregate from said bed;
(e) permitting said aggregate to dry;
(f) firing said dry aggregate to provide setting of the clay and provide finished lightweight aggregate.

* * * * *